Patented Dec. 18, 1945

2,391,255

UNITED STATES PATENT OFFICE 2,391,255

PREPARATION OF SOLS

Morris D. Marshall, Arlington, Mass., assignor to Monsanto Chemical Company, St. Louis, Mo., a corporation of Delaware No Drawing. Original application April 30, 1942, Serial No. 441,213, now Patent No. 2,356,774, dated August 29, 1944. Divided and this application June 28, 1944, Serial No. 542,633

5 Claims. (Cl. 252—313)

This invention relates to the preparation of sols, and particularly to an improved method of preparing relatively stable and substantially salt free aquasols.

Aquasols from which almost all of the inorganic salt has been removed have been prepared in the past by subjecting the aquasol to dialysis. Silica aquasol, for example, has been prepared by reacting an alkali silicate with a mineral acid, subjecting the resulting salt containing sol to dialysis, and then concentrating the sol by evaporation. This, however, is a long and drawn out process, primarily because salt removal by dialysis is slow. Moreover, dialysis requires delicate handling and skilled workmanship, which interferes to a large extent with successful manufacture on a commercial scale.

It is accordingly a primary object of the present invention to provide methods of making substantially salt free aquasols which are greatly superior to prior methods from the standpoint of speed of operation and ease of handling.

A further object of the invention is to provide methods of making aquasols of the type described which methods are thoroughly adapted for large scale operations.

Still further objects and advantages of the invention will appear from the following description and appended claims. Before explaining in detail the present invention, however, it is to be understood that the invention is not limited in its application to the details described herein, since the invention is capable of other embodiments and of being practiced or carried out in various ways.

The invention is carried out in general by first preparing an aquasol containing a colloidal inorganic oxide and a dissolved inorganic salt, then adding to the aquasol a water-miscible organic solvent having a boiling point lower than that of water, or forming a constant boiling mixture with water which distills off at a temperature below the boiling point of water, in an amount sufficient to precipitate the inorganic salt, removing the precipitated salt from the resulting organo-aquasol, as for example by filtering, centrifuging, decantation, or the like, then adding sufficient water to the organo-aquasol to permit removal of substantially all of the organic solvent by distillation and to leave a substantially pure and relatively stable aquasol, and finally distilling off the organic solvent, either as such or in the form of a constant boiling mixture.

In the preparation of the initial aquasol the methods for preparing aquagels described in the Kistler Patent No. 2,093,454 may be followed, but gelation is prevented by proper control of pH. Thus, when preparing silica aquasol, for example, by admixing a mineral acid and an alkali silicate solution, it is essential to operate on the acid side, for most purposes at a pH between 1.5 and 4, but preferably between 1.5 and 3. This insures the stability not only of the initial aquasol, but of the intermediate organo-aquasol, as well as the final aquasol, i. e., makes it possible to prepare sols which do not gel over long periods of time, for example, as long as about thirty days.

A wide variety of water-miscible organic solvents may be used according to the invention, it being necessary only that they have boiling points lower than that of water at atmospheric pressure, or that they form constant boiling mixtures with water which distill off at a temperature below the boiling point of water. Suitable water-miscible organic solvents of the types described include, for example, acetone, methyl alcohol, ethyl alcohol, isopropyl alcohol and normal propyl alcohol.

A further understanding of the invention will be obtained from the following examples:

Example I

Three hundred and fifty-eight (358) pounds of sodium silicate comprising 28.7% $SiO_2$, 8.9% $Na_2O$ and 62.4% $H_2O$ are diluted with 162 pounds of water. This mixture is added to 163.5 pounds of 31% sulfuric acid and the mass is agitated to distribute the silicate throughout the acid. The mixing is carried out in a suitable acid resistant apparatus, and results in an aquasol containing silica and dissolved sodium sulfate. A quantity of ethyl alcohol is then added equal in volume to the volume of the aquasol thus formed, and the sodium sulfate which precipitates is removed by filtration. Sufficient water is then added to the resulting alcohol-aquasol to provide a large excess of water, after which the alcohol is removed in the form of a constant boiling mixture by fractional distillation, leaving in the still a substantially pure aquasol which is stable for a relatively long period of time.

Example II

Eight hundred (800) pounds of sodium silicate containing approximately 9% $Na_2O$ and 29% $SiO_2$ are mixed at room temperature with 350 pounds of water. This mixture is slowly injected at the point of maximum agitation into 335 pounds of 31% $H_2SO_4$ which has been cooled to 0° C. and which is being stirred by a high speed impeller.

The temperature during the mixing is kept below 10° C., and the silicate is added until the pH is about 1.8, or until about 90% of the silicate has been added. Three thousand two hundred (3,200) pounds of acetone which has been cooled to 0° C. are next added, slowly at first, then more rapidly. The resulting mixture, which contains precipitated sodium sulfate crystals $$(Na_2SO_4 \cdot 10H_2O)$$

is then cooled to 0° C. and settled at a temperature between 0 and 5° C. Approximately 85 to 90% of the slightly opalescent sol thus formed is then decanted from the sodium sulfate crystals with the result that about 99% of the total sodium sulfate formed is removed.

To 3600 pounds of the acetone-aquasol prepared as described above, 8000 pounds of water are added. The acetone is then distilled off by simple distillation leaving a substantially pure aquasol in the still which is stable over a relatively long period of time.

*Example III*

Eight hundred (800) pounds of sodium silicate containing approximately 9% $Na_2O$ and 29% $SiO_2$ are mixed at room temperature with 350 pounds of water. This mixture is slowly injected at the point of maximum agitation into 335 pounds of 31% $H_2SO_4$ which has been cooled to 0° C. and which is being stirred by a high speed impeller. The temperature during the mixing is kept below 10° C., and the silicate is added until the pH is about 1.8, or until about 90% of the silicate has been added. Three thousand two hundred (3200) pounds of normal propyl alcohol which has been cooled to 0° C. are next added, slowly at first, then more rapidly. The resulting mixture, which contains precipitated sodium sulfate crystals ($Na_2SO_4 \cdot 10H_2O$), is then cooled to 0° C. and settled at a temperature between 0 and 5° C. Approximately 85 to 90% of the sol thus formed is then decanted from the sodium sulfate crystals with the result that about 99% of the total sodium sulfate formed is removed.

To 3600 pounds of the propyl alcohol-aquasol prepared as described above 8000 pounds of water are added. The propyl alcohol is then distilled off in the form of a constant boiling mixture in a still provided with a fractionating column, leaving in the still a substantially pure aquasol which is stable for a relatively long period of time.

While the examples have been limited, in the interests of brevity, to methods of preparing sols of silica, it will be apparent that salt free aquasols of other oxides may be prepared in a similar manner, that is, by forming the proper salt-containing aquasol, precipitating out the inorganic salt by adding a water-miscible organic solvent, and removing the organic solvent by distillation. Moreover, it is clear that other water-miscible organic solvents may be substituted for the organic solvents described in the examples.

In general, it is desirable to use the alcohol, acetone or other water-miscible organic solvent in an amount by volume at least equal to and preferably greater than the volume of the aquasol being treated. The relative amounts of sol and solvent employed may be varied rather widely, however, it being primarily important only to use sufficient of the organic solvent to precipitate substantially all of the inorganic salt. When organic solvents which distill off in the form of a constant boiling mixture are employed, it will be necessary to use a still provided with a fractionating column, but otherwise simple distillation equipment of conventional construction may be employed.

In certain of the examples reference is made to cooling the various reaction ingredients, and to carrying out the various steps of the process at temperatures in the neighborhood of 0° C. Higher temperatures than this may be used, but it is preferable not to permit the temperature to rise above 20° C. during the preparation of the organo-aquasol because of the lower efficiency of the salt precipitation and the danger of gelation.

The relatively stable and substantially salt free aquasols prepared according to this invention may be used as binders for sand molds, and are valuable film formers, either alone or in combination with other coating materials.

Where reference is made herein to water-miscible organic solvents, it is to be understood that reference is made to organic solvents of the type commonly employed in varnishes, lacquers and like coating compositions, which solvents are capable of precipitating inorganic salts out of an aqueous solution. The term "organic solvents" is also intended to include certain alcohols, such as methyl and ethyl alcohol, which are usually not employed as solvents in the coating art.

The volatile component of the aquasols prepared according to this invention usually consists almost entirely of water, i. e., contains from 98 to 100% water. Thus, the sols of the present invention differ from the sols prepared according to the methods described and claimed in Patent No. 2,285,440, granted to me on June 9, 1942, which contain a predominating amount of organic solvent or solvents.

This application is a division of my copending application, Serial Number 441,213, filed April 30, 1942, issued as Patent Number 2,356,774 on August 29, 1944, which is a continuation-in-part of my application Serial Number 272,404, filed May 8, 1939, now issued as Patent No. 2,285,449.

What I claim is:

1. The method of forming an aquasol substantially composed of a colloidal inorganic oxide and water which comprises forming an aquasol containing a colloidal inorganic oxide and a dissolved inorganic salt, adding a water-miscible organic solvent selected from the group consisting of methyl alcohol and normal propyl alcohol, said solvent being added in an amount sufficient to precipitate the inorganic salt, removing the inorganic salt precipitated thereby, adding additional water to the resulting organo-aquasol and removing the organic solvent by distillation.

2. The method substantially as described in claim 1, but further characterized in that the water-miscible organic solvent is added to the aquasol in an amount by volume at least equal to the volume of the aquasol, the amount of additional water added to the resulting organo-aquasol being sufficient to provide an excess over the amount of organic solvent present.

3. The method substantially as described in claim 1, but further characterized in that the materials being treated are maintained at a temperature between 0 and 20° C. prior to the removal of the organic solvent.

4. The method of forming an aquasol substantially composed of colloidal silica and water which comprises forming an aquasol containing colloidal silica and a dissolved inorganic salt, adding a sufficient quantity of methyl alcohol to precipitate the inorganic salt, removing the inorganic salt precipitated thereby, adding additional water to the resulting methyl alcohol-aquasol, and removing the methyl alcohol by distillation.

5. The method of forming an aquasol substantially composed of a colloidal inorganic oxide and water which comprises forming an aquasol containing a colloidal inorganic oxide and a dissolved inorganic salt, adding a sufficient quantity of normal propyl alcohol to precipitate the inorganic salt, removing the inorganic salt precipitated thereby, adding additional water to the resulting alcohol-aquasol, and removing the propyl alcohol by distillation in the form of a constant boiling mixture.

MORRIS D. MARSHALL.

CERTIFICATE OF CORRECTION.

Patent No. 2,391,255. December 18, 1945.

MORRIS D. MARSHALL.

It is hereby certified that error appears in the printed specification of the above numbered patent requiring correction as follows: Page 2, second column, line 36, for the patent number "2,285,440" read --2,285,449--; and that the said Letters Patent should be read with this correction therein that the same may conform to the record of the case in the Patent Office.

Signed and sealed this 26th day of February, A. D. 1946.

Leslie Frazer (Seal) First Assistant Commissioner of Patents.